United States Patent
Huang et al.

(10) Patent No.: US 12,529,723 B2
(45) Date of Patent: Jan. 20, 2026

(54) IGBT COLLECTOR CURRENT ONLINE DETECTION DEVICE AND METHOD BASED ON GATE CURRENT

(71) Applicant: WUHAN UNIVERSITY, Hubei (CN)

(72) Inventors: Meng Huang, Hubei (CN); Zifan Li, Hubei (CN); Yi Liu, Hubei (CN); Xiaoming Zha, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 202 days.

(21) Appl. No.: 18/604,369

(22) Filed: Mar. 13, 2024

(65) Prior Publication Data
US 2024/0353469 A1  Oct. 24, 2024

(30) Foreign Application Priority Data
Apr. 23, 2023 (CN) .......................... 202310439846.4

(51) Int. Cl.
*G01R 31/26* (2020.01)
(52) U.S. Cl.
CPC ................................ *G01R 31/2608* (2013.01)
(58) Field of Classification Search
CPC ................ G01R 31/26; G01R 31/2608; G01R 31/2601; G01R 31/2621; G01R 31/2642; G01R 31/2644; G01R 19/25; G01R 19/16519; H10D 12/411
See application file for complete search history.

(56) References Cited

U.S. PATENT DOCUMENTS

| | | | |
|---|---|---|---|
| 2019/0346501 A1* | 11/2019 | Pronin | G01R 31/2601 |
| 2021/0293874 A1* | 9/2021 | Kwon | H02H 1/0007 |
| 2023/0261648 A1* | 8/2023 | Loerincz | H03K 17/687 |
| | | | 327/109 |

* cited by examiner

*Primary Examiner* — Son T Le
(74) *Attorney, Agent, or Firm* — JCIP GLOBAL INC.

(57) ABSTRACT

This invention relates to the field of power electronics, specifically addressing an IGBT (Insulated Gate Bipolar Transistor) collector current online detection device and method based on gate current. The detection method involves processing the IGBT gate drive waveform using a Miller plateau detection module to extract the Miller plateau region in the gate drive waveform. The IGBT gate current integration module extracts the voltage across the IGBT gate drive resistor, integrates the voltage waveform during the Miller plateau period, and uses the integration result to characterize the gate current during the Miller plateau. Three sets of integrator output voltages and collector currents under different load currents are measured, and a second-order polynomial fitting is performed internally in the DSP (Digital Signal Processor) to derive a function representing the collector current as a function of the integrator output voltage.

9 Claims, 5 Drawing Sheets

IGBT COLLECTOR CURRENT ONLINE DETECTION DEVICE AND METHOD BASED ON GATE CURRENT

CROSS-REFERENCE TO RELATED APPLICATION

This application claims the priority benefit of China application no. 202310439846.4, filed on Apr. 23, 2023. The entirety of the above mentioned patent application is hereby incorporated by reference herein and made a part of this specification.

BACKGROUND

1. Technical Field

The present invention belongs to the field of power electronics, specifically related to an IGBT collector current online detection device and method based on gate current.

2. Description of Related Art

Insulated Gate Bipolar Transistor (IGBT), with its characteristics of high power capacity, low saturation voltage, and high switching frequency, is widely used in high-voltage and high-power electronic conversion devices, making it one of the promising power semiconductor switching devices. However, IGBT is often considered one of the most vulnerable components in a system. In high-power electronic conversion devices, IGBTs typically operate under conditions of high voltage and large current.

Failures such as hard short circuits in the bridge arm, soft short circuits on the load side, and the loss of clamping effect caused by excessive collector current can lead to IGBT failures. If faults cannot be promptly and accurately detected and located for repair and protection, it can easily result in permanent damage to the IGBT device, leading to equipment destruction and a significant reduction in system reliability. Some industrial surveys have shown that 39% of system failures in power electronic converters can be attributed to IGBT device faults and damage, with IGBT and its driver faults accounting for more than 50% of system failures. Therefore, precise current measurement is a critical function that modern high-voltage, high-current power systems must possess. Accurate measurement of the current in the collector of the IGBT is essential for regulating the output and ensuring safety.

Traditional methods for sensing the collector current of an IGBT often involve using an external series resistor, meaning a small resistor is connected in series between the IGBT emitter and ground. This method is popular due to its low cost and compact size. However, the significant power loss in the inserted resistor can reduce system efficiency. Additionally, any voltage drop across the sensing resistor during the ON state of the switch will decrease the actual gate-emitter voltage of the IGBT, increasing the ON-state voltage drop of the IGBT. This method has lower accuracy and lacks isolation circuitry.

Another common method for detecting the collector current of an IGBT is embedding a sensing structure within the IGBT, known as the current mirror method. It involves measuring the current by serially connecting a resistor to the emitter of the IGBT. As the internal structure of the IGBT module consists of multiple symmetrically arranged current cells, measuring the current of one unit proportionally through a designed built-in current detection circuit allows calculating the current flowing through the entire IGBT based on the proportionality factor M. This method has lower accuracy and poor noise resistance and is often used for overcurrent detection. Moreover, adding a current mirror detection module within the IGBT module increases manufacturing complexity, leading to higher costs.

Currently, various current sensors such as Hall sensors, Rogowski coils, current transformers, and Tunnel Magnetoresistance (TMR) sensors are widely used for IGBT current detection. Current sensors can directly sense current and come with inherent isolation, making them more promising for applications than the non-isolated methods mentioned earlier. However, current sensors typically have higher costs, larger volumes, and lower power densities, making them less suitable for integration.

SUMMARY

In response to the issues existing in the background technology, the present invention provides an online detection device and method for indirectly detecting the IGBT collector current solely using the gate's low-voltage signal.

To address the aforementioned technical issues, the present invention employs the following technical solution: an IGBT collector current universal online detection device based on gate current. The detection device comprises at least the IGBT main circuit, IGBT drive module, Miller plateau detection module, gate current integration module, and DSP module. The DSP is respectively connected to the IGBT drive module, Miller plateau detection module, and gate current integration module, while the IGBT drive module is connected to the Miller plateau detection module and gate current integration module. The IGBT main circuit consists of the first IGBT, second IGBT, and an inductor, where the second IGBT is the one under test. The IGBT drive module comprises a drive module and gate drive resistor.

The IGBT drive module is utilized to drive the second IGBT and connects to the Miller plateau detection module and gate current integration module through the gate drive resistor for the detection of the collector current of the second IGBT.

The Miller plateau detection module is connected to the gate of the second IGBT to detect the Miller plateau of the gate drive voltage of the second IGBT. It outputs the Miller plateau detection results to the DSP module for further processing.

The gate current integration module is connected to the two terminals of the drive resistor. Controlled by the Miller plateau signal output from the DSP module, it integrates the voltage across the gate drive resistor to perform the integration and extraction of the gate current. The extracted results are then fed into the DSP module for computing the collector current.

The DSP module is connected to the output of the Miller plateau detection module, the input of the IGBT drive module, and the analog switch control and output of the gate current integration module. It is responsible for processing the IGBT drive module's drive signal during the Miller plateau period, providing the drive signal for the IGBT drive module, controlling the integration of the gate current during the Miller plateau period, and collecting the differential voltage of the gate current from the ADC of the gate current integration module. After obtaining the output voltage of the gate current integration module, the DSP calculates the collector current using an internal second-order polynomial regression function, thereby achieving collector current detection.

In the aforementioned IGBT collector current universal online detection device based on gate current, the gate of the first IGBT is connected to the emitter of the first IGBT, the collector of the first IGBT is connected to the DC power supply VDD, the emitter of the first IGBT is connected to the collector of the second IGBT, the gate of the second IGBT is connected to the gate drive resistor, the emitter of the second IGBT is grounded, and the inductor is connected in parallel between the emitter and collector of the first IGBT.

In the aforementioned IGBT collector current universal online detection device based on gate current, the Miller plateau detection module comprises a bandpass filter, an amplifier, and a high-speed comparator.

The bandpass filter consists of a high-pass filter and a low-pass filter. The high-pass filter is connected to the gate of the second IGBT drive module to extract the slope characteristics of the gate drive voltage of the second IGBT. The low-pass filter is used to filter out high-frequency noise contained in the output of the high-pass filter.

The amplifier includes an operational amplifier amplification circuit, with the input of the amplifier connected to the output of the bandpass filter to amplify the output of the bandpass filter.

The high-speed comparator has its input connected to the output of the amplifier and the 1.8V reference voltage. The output of the high-speed comparator is connected to the DSP module, converting the amplifier's output and the reference voltage into pulses containing only high and low levels.

In the above-mentioned IGBT collector current universal online detection device based on gate current, the gate current integration module includes a buffer, an analog switch, and an RC fully differential integrator.

The buffer is connected to the ends of the gate drive resistor, serving to isolate the voltage across the gate drive resistor from the analog switch and RC fully differential integrator.

One end of the analog switch is connected to the output of the buffer, while the other end is connected to the input of the RC fully differential integrator. Controlled by the Miller plateau signal provided by the DSP, the analog switch facilitates the connection of the voltage across the gate drive resistor during the Miller plateau period to the RC fully differential integrator.

The RC fully differential integrator is connected to the output of the analog switch. During the Miller plateau period, when the analog switch is closed, the integrator integrates the differential signal $V_{IN\_DIFF}$, resulting in the differential integration signal $V_{OUT\_DIFF}$.

A universal online detection method for IGBT collector current based on gate current is proposed. When the Miller plateau region of the IGBT drive module gate voltage is detected, the voltage across the gate drive resistor is integrated, obtaining the integrated output value of gate current during the Miller plateau period. Three sets of integrator output values and collector current values under different collector currents are measured. Inside the DSP module, a second-order polynomial function representing the collector current in terms of the integrator output value is derived. The detection of collector current is achieved using this second-order polynomial function and the integrator output value.

The specific steps of the universal online detection method for IGBT collector current based on gate current are as follows:

Step 1: Drive the Miller plateau detection module to process the gate drive waveform of the IGBT under test, extracting the Miller plateau region from the gate drive waveform.

Step 2: The gate current integration module of the IGBT under test extracts the voltage across the gate drive resistor, integrates the voltage waveform during the Miller plateau period, and the result of the integration represents the gate current during the Miller plateau period.

Step 3: Measure the integrator output voltage and collector current for three sets of different load currents. Internally, within the DSP module, perform a second-order polynomial fit to obtain a function representing the collector current in terms of the integrator output voltage. Utilize this fitting result to achieve online measurement of collector current through gate current.

The relationship between the collector current and the gate current during the Miller plateau period of the IGBT under test (second IGBT) is expressed as follows:

During the transient when the second IGBT is turned on:

$$I_C = -\frac{R_{G(ON)}G_m}{2}I_G + \frac{G_m(V_{DRIVE} - V_{TH})}{2} \qquad (1)$$

During the transient when the second IGBT is turned off:

$$I_C = -\frac{R_{G(OFF)}G_m}{2}I_G + \frac{G_m V_{TH}}{2} \qquad (2)$$

Where $I_C$ represents the collector current of the IGBT under test (second IGBT), $R_{G(ON)}$ and $R_{G(OFF)}$ are the gate resistances during on-state and off-state, $G_m$ denotes the transconductance of the IGBT under test (second IGBT), $I_G$ is the gate current during the Miller plateau period of the IGBT under test (second IGBT), $V_{DRIVE}$ signifies the drive voltage of the IGBT under test (second IGBT), and $V_{TH}$ is the threshold voltage of the IGBT under test (second IGBT).

During the Miller plateau period, with the analog switch open, the voltage across the gate drive resistor is fed into the RC fully differential integrator. The RC fully differential integrator integrates the differential signal $V_{IN\_DIFF}$ and outputs the differential integration signal $V_{OUT\_DIFF}$. The relationship between the input and output of the RC fully differential integrator is expressed as:

$$V_{OUT\_DIFF} = \frac{V_{IN\_DIFF}}{RC}t_{miller} = \frac{I_G \times R_{G(OFF)}}{RC}t_{miller} \qquad (3)$$

Where RC represents the resistance and capacitance values in the RC fully differential integrator, $t_{miller}$ is the fixed Miller plateau duration controlled by the DSP module, $I_G$ is the gate current of the IGBT under test, and $R_{G(OFF)}$ is the gate turn-off resistance.

The second-order polynomial function expression for the relationship between the collector current and the integrator output values is as follows:

$$I_C = aV_{OUT\_DIFF}^2 + bV_{OUT\_DIFF} + c \qquad (4)$$

Measurements for three sets of different collector currents and integrator output values are denoted as $I_{C1}$, $V_{OUT\_DIFF1}$, $I_{C2}$, $V_{OUT\_DIFF2}$, $I_{C3}$, and $V_{OUT\_DIFF3}$. These measured values are input into the DSP module. The system of three simultaneous equations is solved using the back-substitution process and the method of eliminating principal elements:

$$\begin{cases} I_{C1} = aV_{OUT\_DIFF1}^2 + bV_{OUT\_DIFF1} + c \\ I_{C2} = aV_{OUT\_DIFF2}^2 + bV_{OUT\_DIFF2} + c \\ I_{C3} = aV_{OUT\_DIFF3}^2 + bV_{OUT\_DIFF3} + c \end{cases} \quad (5)$$

By solving for the coefficients a, b, and c, a second-order polynomial function describing the relationship between the collector current and the integrator output values is established.

DESCRIPTION OF THE EMBODIMENTS

The following will provide a clear and comprehensive description of the technical solutions in the exemplary embodiments of the present invention. It is evident that the described embodiments are only a portion of the implementations of the present invention, not the entirety. Based on the embodiments disclosed in the present invention, all other embodiments obtained by those skilled in the art without inventive effort fall within the scope of protection of the present invention.

It should be noted that, in non-conflicting situations, the embodiments in the present invention and the features in these embodiments can be combined with each other.

The following is a more detailed explanation of the present invention based on specific embodiments, but it is not intended to limit the scope of the invention.

This embodiment provides a method for indirectly detecting the IGBT collector current using only the gate-emitter low-voltage signal. It aims to address issues present in existing technologies, such as the requirement for high-voltage devices, high costs, lack of integration convenience, and large volume when detecting the IGBT collector current.

The method is based on the unique Miller plateau relationship between the gate current ($I_G$) and the collector current ($I_C$) of the IGBT. It allows for the indirect measurement of $I_C$ by measuring $I_G$ during the Miller plateau period, enabling the periodic measurement of $I_C$ during turn-on and turn-off transient periods. This relationship is universal and exists in all IGBTs. By solving a system of three linear equations using three sets of $I_G$ and $I_C$ data obtained under different operating conditions, the relationship can be determined in the DSP. With this relationship established, the collector current $I_C$ can be calculated based on the measured $I_G$ during the Miller plateau period. This eliminates the need for pre-measuring extensive data for curve fitting, providing a novel approach for IGBT collector current detection.

This embodiment is implemented through the following technical solution: a universal online detection device for IGBT collector current based on gate current, comprising at least: IGBT drive module, Miller plateau detection module, gate current integration module, and DSP module:

The IGBT drive module is used to drive the IGBT for which the current needs to be measured and provides the gate drive resistor. This facilitates connection to the Miller plateau detection module and the gate current integration module for collector current detection.

The Miller plateau detection module is connected to the gate of the IGBT to detect the Miller plateau of the IGBT gate drive voltage. It outputs the Miller plateau detection results to the DSP module for processing.

The gate current integration module is connected to the ends of the drive resistor. Controlled by the Miller plateau signal outputted by the DSP, it integrates the voltage across the gate resistor's terminals, effectively integrating the gate current. The extracted result is then fed into the DSP for calculating the collector current.

The DSP is connected to the output of the Miller plateau detection module, the input of the IGBT drive module, and the analog switch control and integration module output of the gate current integration module. It processes the IGBT drive Miller plateau signal, provides the IGBT drive signal, controls the integration of gate current during the Miller plateau period, and collects the differential voltage outputted by the gate current integration module through ADC. After obtaining the output voltage of the gate current integration module, the DSP calculates the collector current using an internal second-order polynomial regression function, thereby achieving collector current detection.

The relationship between the collector current ($I_C$) and the gate current ($I_G$) during the Miller plateau period of the IGBT under test is expressed as follows:

During the transient when the second IGBT is turned on:

$$I_C = -\frac{R_{G(ON)}G_m}{2}I_G + \frac{G_m(V_{DRIVE} - V_{TH})}{2} \quad (6)$$

During the transient when the second IGBT is turned off:

$$I_C = -\frac{R_{G(OFF)}G_m}{2}I_G + \frac{G_m V_{TH}}{2} \quad (7)$$

Where $I_C$ represents the collector current of the IGBT under test (second IGBT), $R_{G(ON)}$ and $R_{G(OFF)}$ are the gate resistances during on-state and off-state, $G_m$ denotes the transconductance of the IGBT under test (second IGBT), $I_G$ is the gate current during the Miller plateau period of the IGBT under test (second IGBT), $V_{DRIVE}$ signifies the drive voltage of the IGBT under test (second IGBT), and $V_{TH}$ is the threshold voltage of the IGBT under test (second IGBT).

The Miller plateau detection module includes a bandpass filter, an amplifier, and a high-speed comparator. The bandpass filter consists of a high-pass filter and a low-pass filter.

The high-pass filter is connected to the IGBT's gate, extracting the slope characteristic of the IGBT gate drive voltage, while the low-pass filter is used to filter out high-frequency noise contained in the output of the high-pass filter. The amplifier comprises an operational amplifier circuit connected to the output of the bandpass filter, amplifying the output of the bandpass filter. The high-speed comparator is connected to the output of the amplifier and a 1.8V reference voltage. It compares the output of the amplifier with the reference voltage, converting the amplifier's output into a pulse containing only high and low levels that can be recognized by the DSP.

The Miller plateau detection module's output is connected to the DSP, enabling Miller plateau detection.

After the Miller plateau detection module sends its output to the DSP, the DSP captures the falling edge of the first pulse using the eCAP (Enhanced Capture) module, resulting in a high-level output. Subsequently, the DSP introduces a delay of $t_{miller}$ using an internal timer, followed by a low-level output. This process is designed to achieve Miller plateau detection, and the transformed waveform is used to control the analog switch's state.

The Gate Current Integration module comprises a buffer, an analog switch, and an RC fully differential integrator:

The buffer is connected to the terminals of the drive resistor to isolate the voltage across the drive resistor from the analog switch and the RC fully differential integrator. This isolation prevents the downstream integration from affecting the drive voltage.

The analog switch is connected between the output of the buffer and the input of the RC fully differential integrator. Controlled by the Miller plateau signal from the DSP, it facilitates the connection of the voltage across the gate resistor during the Miller plateau period to the RC fully differential integrator.

The RC fully differential integrator is connected to the output of the analog switch. During the Miller plateau period, when the analog switch is closed, the voltage across the gate resistor is fed into the RC fully differential integrator. The integrator performs the integration of the differential signal $V_{IN\_DIFF}$ and outputs the differential integrated signal $V_{OUT\_DIFF}$. The relationship between the input and output of the RC fully differential integrator can be expressed as:

$$V_{OUT\_DIFF} = \frac{V_{IN\_DIFF}}{RC} t_{miller} = \frac{I_G \times R_{G(OFF)}}{RC} t_{miller} \quad (8)$$

Where RC represents the resistance and capacitance values in the RC fully differential integrator, $t_{miller}$ is the fixed Miller plateau duration controlled by the DSP module, $I_G$ is the gate current of the IGBT under test, and $R_{G(OFF)}$ is the gate turn-off resistance.

The RC fully differential integrator's input and output are directly proportional. From the relationship between the input and output of the fully differential integrator, expressed as an integral equation, where RC, $t_{miller}$, and $R_G$ are constants, it follows that the gate current $I_G$ is directly proportional to the integrator output $V_{OUT\_DIFF}$.

This embodiment also provides a universal online detection method for the collector current of IGBT based on gate current, comprising at least:

When the Miller plateau region of the gate voltage is detected, the voltage across the driving resistor is integrated to obtain the integrated output value of the gate current during the Miller plateau period. Three sets of output values from the integrator and corresponding collector current values are measured. Inside the digital signal processing module DSP, a second-order polynomial function of the collector current with respect to the integrator output value is formed. Subsequently, the collector current detection can be achieved using this function and the integrator output value.

The method comprises the following steps: A: Driving the Miller plateau detection module to process the gate drive waveform of the IGBT under test, extracting the Miller plateau region from the gate drive waveform of the IGBT under test; B: The gate drive current integration module of the IGBT under test extracts the voltage across the gate drive resistor, integrates the voltage waveform during the Miller plateau period, and the result of the integration represents the gate current during the Miller plateau period; C: Measure the integrator output voltage and collector current under three different load currents. Internally, within the digital signal processing module DSP, perform a second-order polynomial fit to form a function of the collector current with respect to the integrator output voltage. This fitted result enables the online measurement of the collector current through the gate current.

The digital signal processing module DSP internally forms a second-order polynomial function of the collector current with respect to the integrator output value. The second-order polynomial function expression for the collector current with respect to the integrator output value is as follows:

$$I_C = aV_{OUT\_DIFF}^2 + bV_{OUT\_DIFF} + c \quad (9)$$

Measure three sets of integrator output values and collector current values for different collector currents, denoted as $I_{C1}, V_{OUT\_DIFF1}, I_{C1}, V_{OUT\_DIFF1}, I_{C1}, V_{OUT\_DIFF1}$. Input these measured values into the DSP, and by using a back-substitution process and the Gaussian elimination method to solve the system of three linear equations, the coefficients a, b, and c can be obtained. This process results in the formation of a second-order polynomial function expressing the collector current in terms of the integrator output value.

Figure 1:
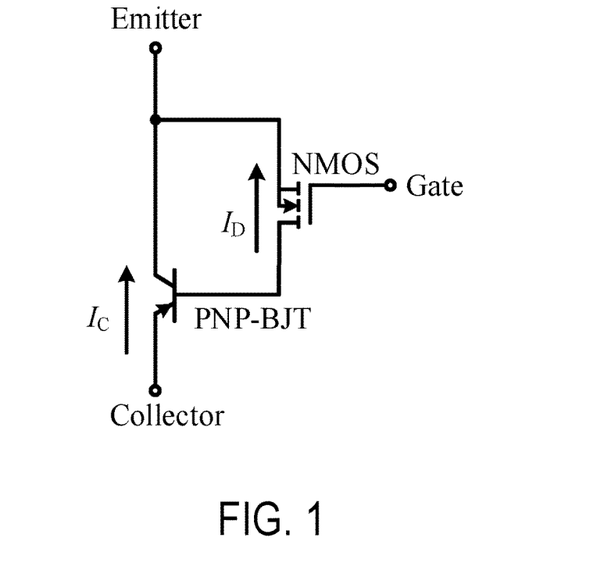
FIG. 1 depicts a simplified IGBT model in an embodiment of the present invention.

The derivation process of the relationship between IG and IC during the Miller plateau is as follows:

As shown in FIG. 1, it is the simplified model of an IGBT, which is a MOSFET driving a PNP-type BJT. In this IGBT, the electron current $I_n$ flowing through the MOSFET is used as the base drive current for the BJT. Therefore, the hole current $I_p$ flowing through the BJT is given by:

$$I_p = \beta_{PNP} I_n = \left( \frac{\alpha_{PNP}}{1 - \alpha_{PNP}} \right) I_n \quad (10)$$

Where $\beta_{PNP}$ represents the common-emitter AC current gain of the BJT, and aPNP is the common-base AC current gain of the BJT. The emitter current $I_E$ of the IGBT can be obtained by adding the electron current and the hole current:

$$I_E = I_n + I_p = \frac{I_n}{1 - \alpha_{PNP}} \quad (11)$$

Due to the high input impedance characteristic of the MOS gate structure, the gate current $I_G$ is approximately zero in steady-state. Even during switching, the charging and discharging gate currents are much smaller than the collector current. Therefore, JE is approximately equal to $I_C$. The electron current $I_n$ is essentially the drain current of the MOSFET. Thus, $I_C$ and $I_D$ can be related as follows:

$$I_C = \frac{I_D}{1-\alpha_{PNP}} \quad (12)$$

Assuming a voltage source switching between $V_{DRIVE}$ and ground, the switched signal is applied to the gate of the IGBT. During the turn-on process, the gate current $I_G$ of the IGBT (also a MOSFET) and the drain current $I_D$ of the MOSFET can be expressed as follows:

$$I_G = \frac{V_{DRIVE} - V_{GE}}{R_{G(ON)}} \quad (13)$$

$$I_D = \frac{g_m(V_{GE} - V_{TH})}{2} \quad (14)$$

Where $V_{GE}$ is the gate-emitter voltage of the IGBT, and $V_{TH}$ is the threshold voltage for turning the IGBT on and off. By combining expression (9) and (10), we can obtain:

$$I_G = \frac{V_{DRIVE} - V_{TH} - \frac{2I_D}{g_m}}{R_{G(ON)}} \quad (15)$$

Substituting expression (8) into expression (11), we can obtain the relationship between $I_C$ and $I_G$:

$$I_C = -\frac{R_{G(ON)}g_m}{2(1-\alpha_{PNP})}I_G + \frac{g_m(V_{DRIVE} - V_{TH})}{2(1-\alpha_{PNP})} \quad (16)$$

Where $g_m$ is the transconductance of the MOSFET, and it is related to the transconductance $G_m$ of the IGBT as follows:

$$G_m = \frac{g_m}{1-\alpha_{PNP}} \quad (17)$$

During the turn on Miller plateau, $I_C$ can be determined by the following equation:

$$I_C = -\frac{R_{G(ON)}G_m}{2}I_G + \frac{G_m(V_{DRIVE} - V_{TH})}{2} \quad (18)$$

Figure 2:
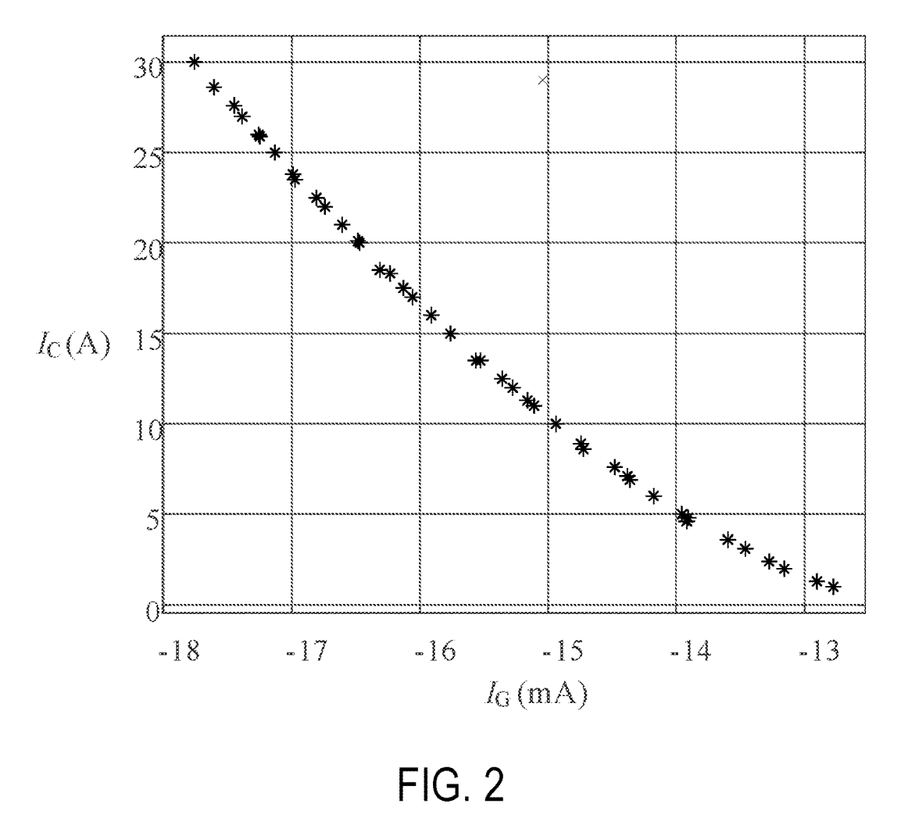
FIG. 2 illustrates the relationship between the collector current and the gate current of the IGBT in an embodiment of the present invention.

During the turn off Miller plateau, $I_C$ can be determined by the following equation:

$$I_C = -\frac{R_{G(OFF)}G_m}{2}I_G + \frac{G_m V_{TH}}{2} \quad (19)$$

Where $R_{G(ON)}$ and $R_{G(OFF)}$ are the on-state and off-state gate resistances, $V_{TH}$ is the threshold voltage of the IGBT, and $R_G$, $V_{DRIVE}$, and $V_{TH}$ are typically constants. The $G_m$ of the IGBT can be found from the $I_C$ vs. $V_{GE}$ transfer curve in the device datasheet. Therefore, there is indeed a relationship between the gate current $I_G$ and the collector current $I_C$, as shown in FIG. 2. This is a unique relationship introduced by the IGBT structure, and it is only affected by temperature and process variations.

Taking Infineon IKW30N60H3 (Infineon Technologies AG, IGBT model: IKW30N60H3) as an example, with a threshold voltage ($V_{TH}$) of 5.1V and an off-state gate resistance ($R_{G(OFF)}$) of 500Ω, substituting these values into expression (19) yields:

$$I_C = -\frac{500G_m}{2}I_G + \frac{5.1G_m}{2} \quad (20)$$

Given $G_m = -623.1875 I_G - 6.3565125$, the relationship between $I_C$ and $I_G$ can be obtained as follows:

$$I_C = -155796.875(I_G + 0.0102)^2 \quad (21)$$

It represents a polynomial relationship of second order.

Figure 3:
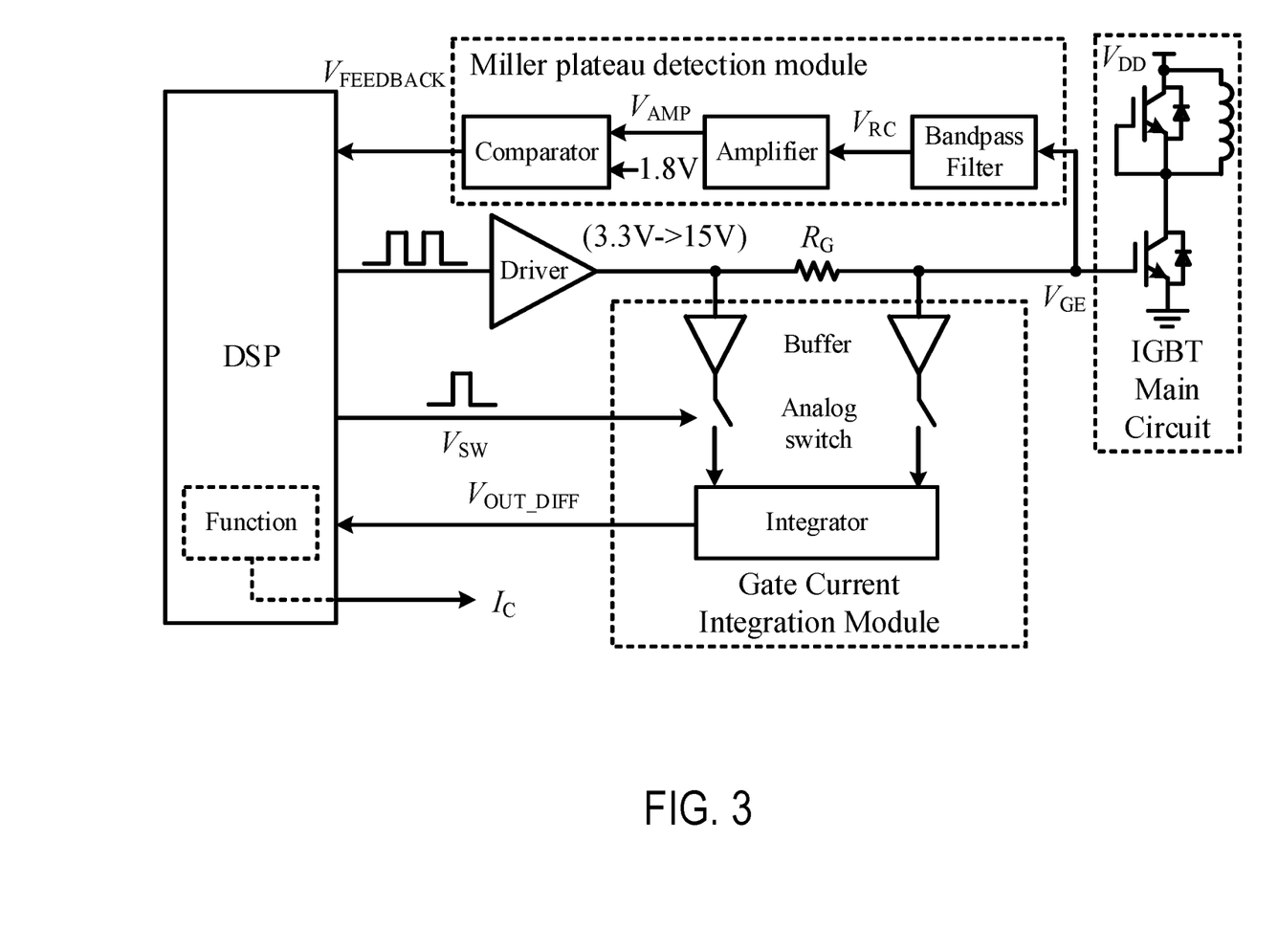
FIG. 3 shows a circuit diagram in an embodiment of the present invention, where the detection of the collector current is based on the gate current and the collector current.

As shown in FIG. 3, a universal online detection device for IGBT collector current based on gate current includes at least: IGBT Main Circuit, IGBT Drive Module, Miller plateau Detection Module, Gate Current Integration Module, and DSP module.

The IGBT main circuit comprises the tested IGBT forming a half-bridge structure with the second IGBT at the bottom and the first IGBT at the top. The first IGBT is parallel with an inductor to form a clamping inductance load. The IGBT drive module includes a drive module and a gate resistor $R_G$. The gate of the first IGBT is connected to the emitter of the first IGBT, the collector is connected to the DC power supply VDD, and the emitter is connected to the collector of the second IGBT. The gate of the tested IGBT (second IGBT) is connected to the gate resistor $R_G$, and the emitter is grounded. The inductor L is connected in parallel between the collector and emitter of the first IGBT. The IGBT main circuit is not limited to this embodiment and can be any circuit topology containing the tested IGBT.

As shown in FIG. 3, the IGBT drive module is connected to the PWM waveform output from the DSP module and the gate of the tested IGBT (second IGBT), providing the drive signal for the second IGBT.

The drive boost section is connected to the PWM waveform output from the DSP module and the gate resistor RG. It is used to boost the 3.3V PWM signal output from the DSP to a 15V PWM waveform.

The gate resistor RG is connected to the output of the drive boost section, the gate of the second IGBT, the input of the Miller plateau extraction module, and the input of the gate current integration module.

As shown in FIG. 3, the Miller plateau detection module is connected to the gate of the tested IGBT (second IGBT) for detecting the Miller plateau region of the gate drive voltage of the tested IGBT second IGBT. It outputs the feedback signal to the DSP module to generate the Miller plateau region detection waveform.

The Miller plateau detection module comprises a bandpass filter, an amplifier, and a high-speed comparator.

Figure 4:
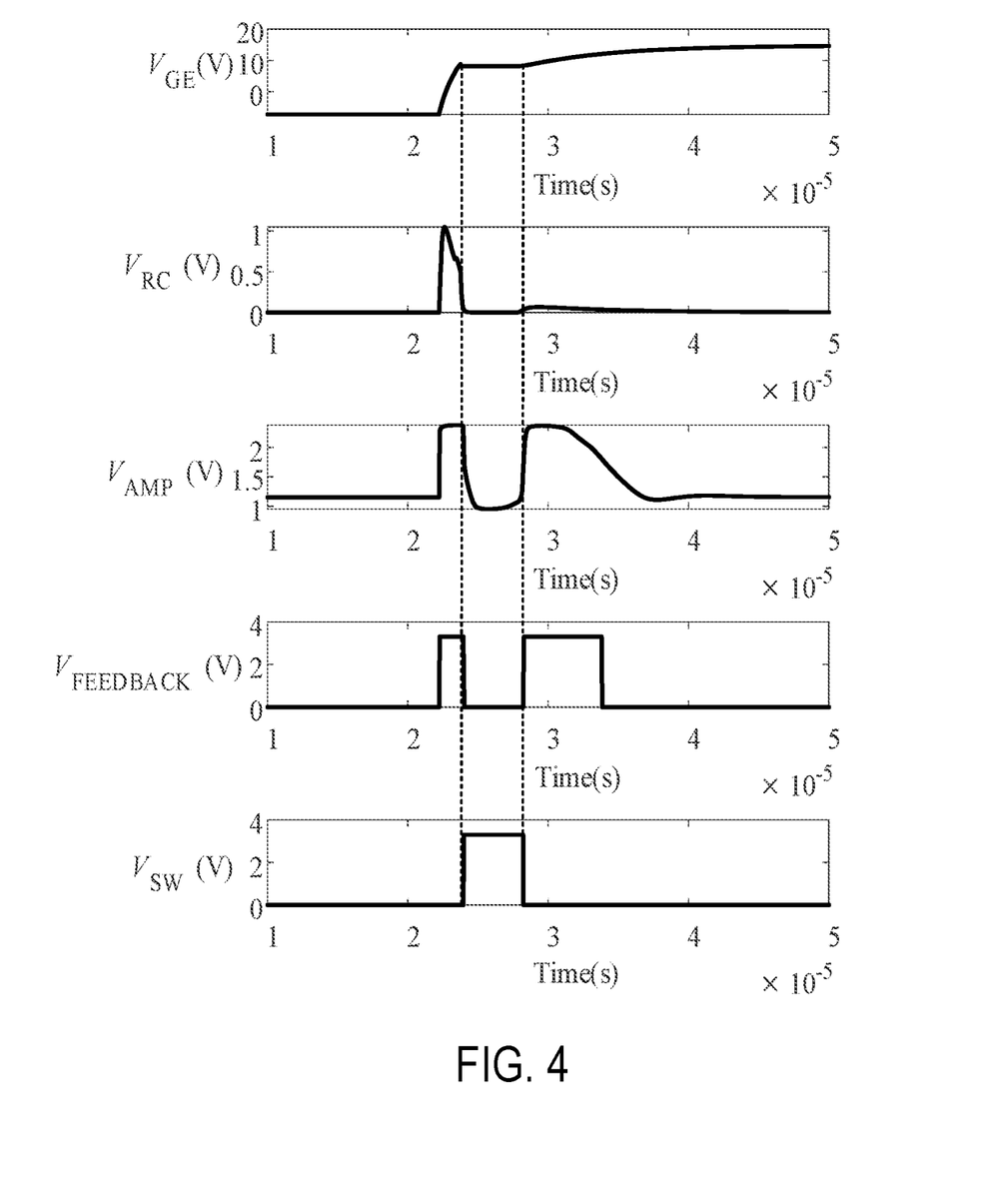
FIG. 4 presents key waveform diagrams at critical nodes of the Miller plateau extraction circuit in an embodiment of the present invention.

The input of the bandpass filter is connected to the gate of the second IGBT, with the gate waveform of the second IGBT shown in FIG. 4 as $V_{GE}$. The output of the bandpass filter is connected to the input of the amplifier. The bandpass filter consists of a high-pass filter connected to the gate of the second IGBT, extracting the slope characteristics of the gate drive voltage of the second IGBT, and a low-pass filter used to filter out high-frequency noise contained in the output of the high-pass filter. The output waveform is shown in FIG. 4 as $V_{RC}$.

The input of the amplifier is connected to the output of the bandpass filter, and its output is connected to the input of the high-speed comparator. The amplifier consists of an operational amplifier circuit, amplifying the output of the bandpass filter, with the output waveform shown in FIG. 4 as $V_{AMP}$.

The input of the high-speed comparator is connected to the output of the amplifier and a 1.8V reference voltage. The output of the comparator is connected to the DSP module. It compares the output of the amplifier with the 1.8V reference voltage, converting the amplifier's output into a pulse recognizable by the DSP module, containing only high and low levels. The output waveform is shown in FIG. 4 as $V_{FEEDBACK}$.

As shown in FIG. 3, the gate current integration module's input is connected to both ends of the gate resistor $R_G$ and is also connected to the Miller plateau detection signal $V_{SW}$ provided by the DSP module. This connection is used to integrate the gate current during the Miller plateau, obtaining the differential voltage $V_{OUT\_DIFF}$ that characterizes the gate current. It is then output to the DSP module for collector current calculation.

The gate current integration module includes a buffer, an analog switch, and an RC fully differential integrator.

The input of the buffer is connected to both ends of the gate drive resistor, serving to isolate the voltage across the gate drive resistor from the analog switch and the RC fully differential integrator. This isolation prevents the later-stage integration circuit from affecting the drive voltage.

One end of the analog switch is connected to the output of the buffer, and the other end is connected to the input of the RC fully differential integrator. Controlled by the Miller plateau signal $V_{SW}$ output by the DSP module, the analog switch facilitates the connection of the voltage across the gate drive resistor during the Miller plateau to the RC fully differential integrator.

The RC fully differential integrator is connected to the output of the analog switch. During the Miller plateau period, the analog switch is closed, allowing the voltage across the gate drive resistor to be input into the RC fully differential integrator. The integrator integrates the differential signal $V_{IN\_DIFF}$, producing the differential integration signal $V_{OUT\_DIFF}$. The relationship between the output of the RC fully differential integrator and the gate current is expressed as:

$$V_{OUT\_DIFF} = \frac{V_{IN\_DIFF}}{RC} t_{miller} = \frac{I_G \times R_{G(OFF)}}{RC} t_{miller} \quad (22)$$

Where RC represents the resistance and capacitance values in the RC fully differential integrator, $t_{miller}$ is the fixed Miller plateau duration controlled by the DSP module, $I_G$ is the gate current of the IGBT under test, and $R_{G(OFF)}$ is the gate turn-off resistance.

As shown in FIG. 3, the DSP module is connected to the output of the Miller plateau detection module, the input of the drive module, the control terminal of the analog switch in the gate current integration module, and the output of the gate current integration module.

The DSP module is connected to the output of the Miller plateau detection module. The DSP captures the falling edge of the first pulse through the eCAP module, outputs a high level, then delays by the internal timer $t_{miller}$, and outputs a low level. This sequence achieves Miller plateau detection, and the transformed waveform is shown in FIG. 4 as $V_{SW}$, used to control the opening and closing of the analog switch.

The DSP module is connected to the input of the drive module, providing the PWM signal for driving the IGBT.

The DSP module is connected to the control terminal of the analog switch in the gate current integration module. It controls the closing of the analog switch during the Miller plateau, allowing the gate current during the Miller plateau to be input into the RC fully differential integrator.

The DSP module is connected to the output of the gate current integration module. The internal ADC of the DSP samples $V_{OUT\_DIFF}$ and the sampled value are entered into a second-order polynomial function representing the collector current of the tested IGBT second IGBT with respect to the integrator output. This process allows for the determination of the collector current of the tested IGBT second IGBT, achieving IGBT collector current detection.

Figure 6:
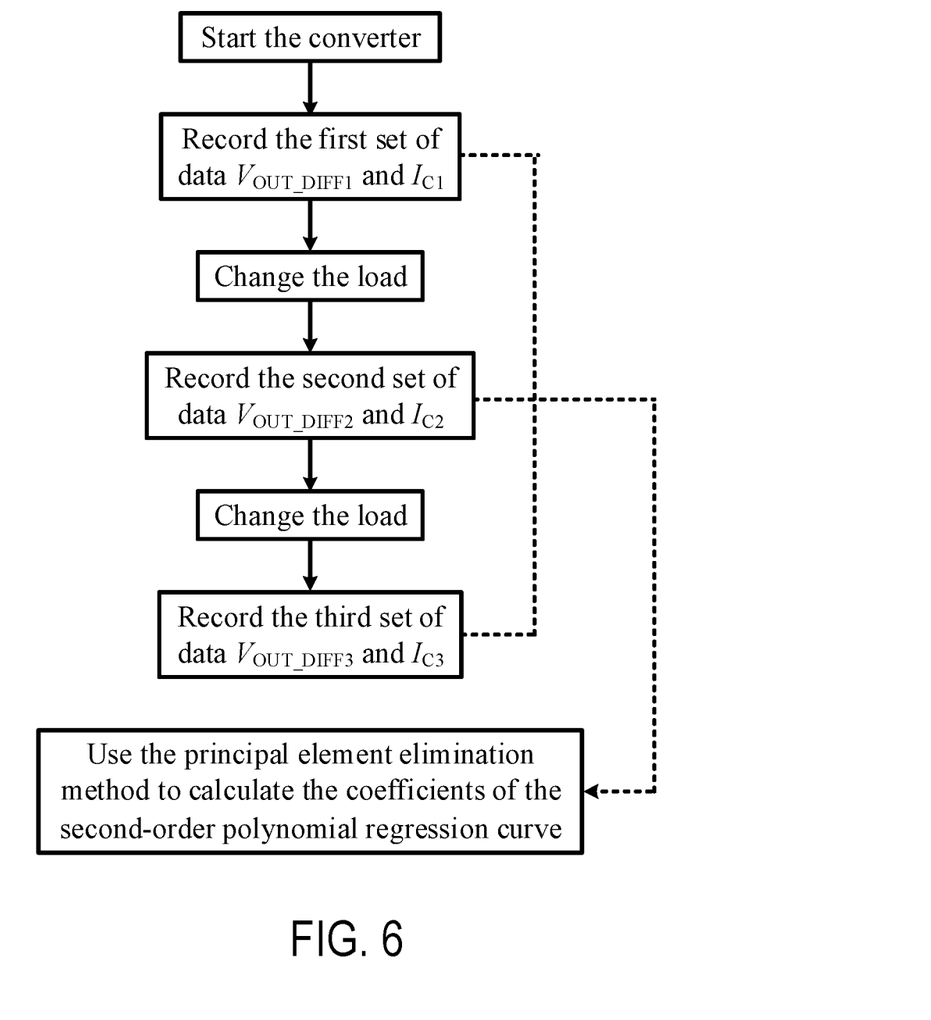
FIG. 6 represents the flowchart of the DSP second-order polynomial fitting process in an embodiment of the present invention.

As shown in FIG. 6, the DSP module internally forms a second-order polynomial function representing the collector current with respect to the integrator output.

The expression for the second-order polynomial function of the collector current with respect to the integrator output is as follows:

$$I_C = aV_{OUT\_DIFF}^2 + bV_{OUT\_DIFF} + c \quad (23)$$

The process of forming the function expression is depicted in FIG. 6. Measure the integrator output values and collector current values for three different collector currents, denoted as $I_{C1}$, $V_{OUT\_DIFF1}$, $I_{C2}$, $V_{OUT\_DIFF2}$, $I_{C3}$, and $V_{OUT\_DIFF3}$. Input these measured values into the internal DSP module. Employing a back-substitution process and the method of eliminating main elements in a three-variable linear equation system, solve the following system of equations:

$$\begin{cases} I_{C1} = aV_{OUT\_DIFF1}^2 + bV_{OUT\_DIFF1} + c \\ I_{C2} = aV_{OUT\_DIFF2}^2 + bV_{OUT\_DIFF2} + c \\ I_{C3} = aV_{OUT\_DIFF3}^2 + bV_{OUT\_DIFF3} + c \end{cases} \quad (24)$$

Exactly, by solving the system of equations, you can obtain the values of the coefficients a, b, and c. These values will form the second-order polynomial function representing the collector current with respect to the integrator output.

The method for universal online detection of IGBT collector current based on gate current is illustrated in FIGS. 3 to 6. The embodiment includes:

Detection of the Miller plateau region of the IGBT gate voltage. When the Miller plateau region of the gate voltage is detected, the voltage across the drive resistor is integrated to obtain the integrated output value of the gate current during the Miller plateau period.

Measurement of the integrated output values of three sets of different collector currents and collector current values. A second-order polynomial function of the collector current with respect to the integrator output values is formed within the DSP module.

Utilization of the established function and integrator output values for collector current detection.

Figure 5:
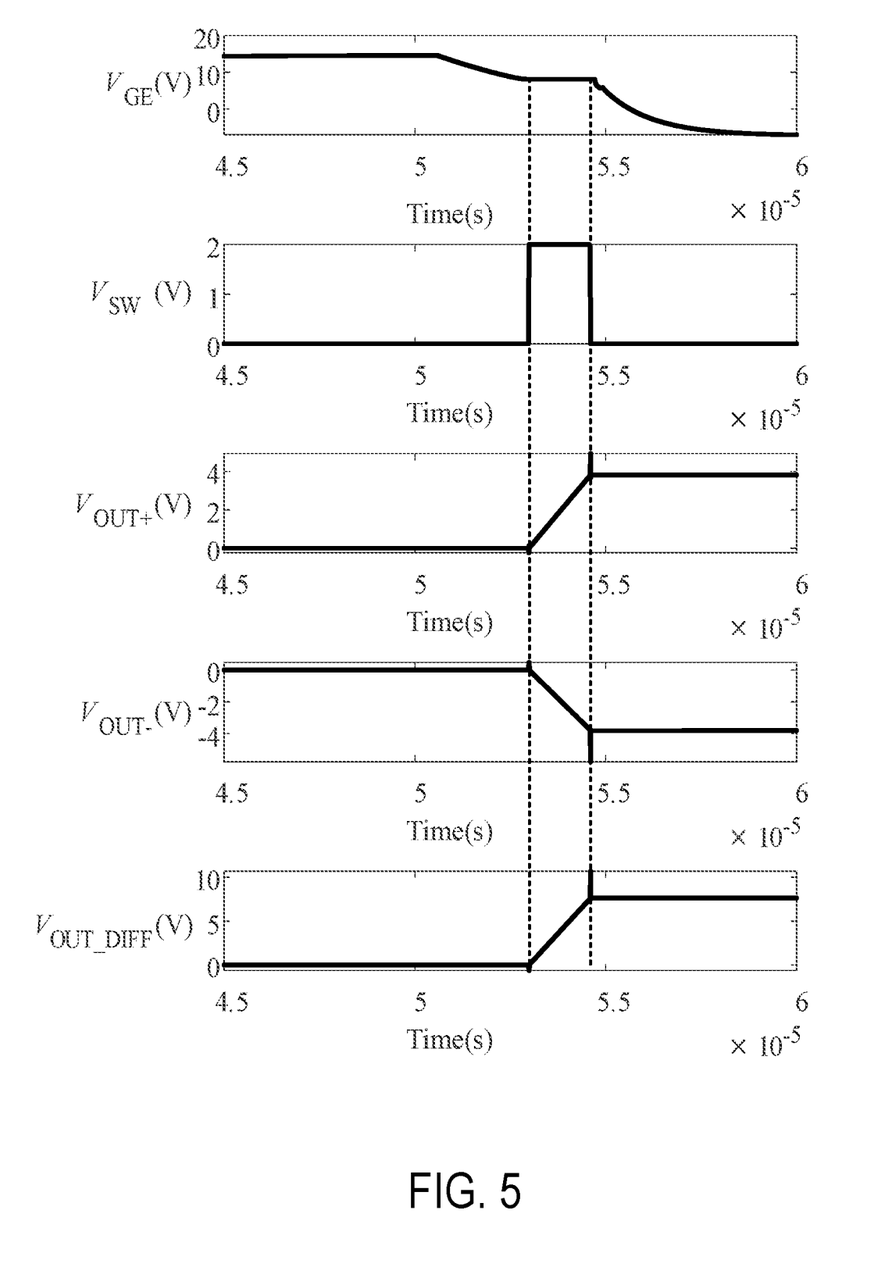
FIG. 5 displays key waveform diagrams at critical nodes of the gate current extraction circuit in an embodiment of the present invention.

Specifically, the IGBT gate voltage to be measured is connected to the input of the Miller plateau detection module. The gate voltage signal is filtered using a bandpass filter to obtain $V_{RC}$. $V_{RC}$ is then amplified and fed into a high-speed comparator, which compares it with a 1.8V voltage to generate a pulse voltage $V_{FEEDBACK}$ containing only high and low levels. DSP processes $V_{FEEDBACK}$ to obtain the Miller plateau region signal $V_{SW}$. The Miller plateau region signal controls the analog switch in the gate current integration module to open and close. The voltage across the gate resistor is buffered and sent into an RC fully differential integrator through an analog switch. The fully differential integrator integrates the gate current during the Miller plateau period to obtain the representative value $V_{OUT\_DIFF}$ of the gate current.

By changing the collector current of the IGBT under test and measuring the integrated output values and collector current values for three sets, the data is fed into the DSP. The DSP uses a back-substitution process to eliminate the main elements and solve a system of three linear equations, forming a second-order polynomial function of the collector current with respect to the integrator output values. Subsequently, collector current detection is achieved using this polynomial function and the integrator output values.

The disclosed method for collector current detection can be further applied to load current detection in other semiconductor devices such as MOSFETs and SiC IGBTs. The function of collector current with respect to integrator output values within the DSP can be fitted with third-order, fourth-order, and higher-order polynomial functions. The method can also be applied to overcurrent detection in semiconductor devices like IGBTs. The DSP in the collector current detection method can be replaced with various controllers such as STM32, FPGA, etc.

The above is only the preferred embodiment of the present invention and does not limit the implementation and protection scope of the present invention. Those skilled in the art should be aware that solutions obtained by equivalent substitutions and obvious changes based on the contents of this specification should be included within the scope of the present invention's protection.

Compared to existing technologies, the present invention offers several advantages:

1. Indirect Detection on Low Voltage Side: The unique Miller plateau relationship between gate current and collector current ($I_G$ and $I_C$) allows for the indirect measurement of collector current through gate current. This enables collector current detection on the low-voltage side, eliminating the drawbacks associated with high-voltage side detection, such as high cost, large device size, reduced main circuit efficiency, low accuracy, and susceptibility to DC voltage effects.
2. Stability of Miller plateau Relationship: The unique Miller plateau relationship between gate current and collector current ($I_G$ and $I_C$) is stable and exists in every IGBT. It does not vary with changes in applied DC voltage, only depending on temperature and IGBT technology.
3. Integration of Miller plateau Integration: Extracting gate current by integrating the gate current during the Miller plateau offers advantages in suppressing high-frequency noise and amplifying gate current. The use of an integrator helps amplify gate current while suppressing noise during the Miller plateau period, ensuring accurate gate current extraction and high accuracy in collector current measurement.
4. Efficiency in Data Collection: The proposed measurement method only requires data on the integrator digital values and collector current for three different load currents to form a function of collector current with respect to integrator digital values. This allows for quick implementation of online collector current detection for any IGBT, avoiding the need for pre-measuring extensive data for data fitting as in other collector current detection methods.
5. Simple and Isolated Voltage Extraction: The extraction method only requires voltage extraction from the gate resistor of the IGBT, which is simple and easy to implement. Additionally, it is inherently isolated, avoiding any impact on the IGBT main circuit and driving circuit.
6. Ease of Integration: The components used in the extraction circuit, such as operational amplifiers, resistors, and capacitors, are easily integrable. This makes the extraction circuit easy to integrate, allowing it to be included in the driving circuit and manufactured as an integrated circuit (IC) chip.
7. Overcoming Parasitic Inductance Issues: The invention overcomes the problem of inaccurate measurement results caused by detecting $V_{GE}$ during the Miller plateau, which can affect the parasitic inductance on the IGBT emitter side. In contrast, IG extraction does not suffer from this issue, ensuring high accuracy.

This fitting result enables online measurement of the collector current through the gate current. This method avoids the use of high-voltage and high-power devices, is easy to integrate, has low detection costs, and is easy to implement.

What is claimed is:
1. A universal online detection device configured for detecting an Insulated Gate Bipolar Transistor (IGBT) collector current based on a gate current, comprising:
at least an IGBT main circuit, an IGBT drive module, a Miller plateau detection module, a gate current integration module, and a digital signal processing (DSP) module;
wherein the DSP module is connected respectively to the IGBT drive module, the Miller plateau detection module, and the gate current integration module, wherein the IGBT drive module is connected respectively to the Miller plateau detection module and the gate current integration module, the IGBT main circuit includes: a first IGBT, a second IGBT, and an inductor, wherein the second IGBT serves as an IGBT under test, the IGBT drive module comprises; a drive module and a gate drive resistor;
wherein the IGBT drive module is configured to drive the second IGBT and is connected to the Miller plateau detection module and the gate current integration module through the gate drive resistor for the purpose of detecting the collector current of the second IGBT;
wherein the Miller plateau detection module is connected to a gate of the second IGBT, configured to detect the Miller plateau of a gate drive voltage of the second IGBT, and outputting Miller plateau detection results to the DSP module for further processing;
wherein the gate current integration module is connected to two ends of the gate drive resistor and is controlled by a Miller plateau signal output by the DSP module, the gate current integration module is configured to integrate a voltage across the gate drive resistor, facilitating the extraction of gate current through integration, and the extracted result is then fed into the DSP module for calculating the collector current;

wherein the DSP module is connected to an output of the Miller plateau detection module, an input of the IGBT drive module, and an analog switch control and output of the gate current integration module, configured to process signals received to achieve the following functionalities:

processing the Miller plateau signal to drive the IGBT drive module;

providing the driving signal for the IGBT drive module;

controlling the integration of the gate current during a Miller plateau period;

acquiring a differential voltage from the gate current integration module's ADC output;

performing an internal second-order polynomial regression function to calculate the collector current from the gate current integration module's output voltage.

2. The universal online detection device configured for detecting the IGBT collector current according to claim 1, wherein:

a gate of the first IGBT is connected to an emitter of the first IGBT, a collector of the first IGBT is connected to a DC power supply (VDD), the emitter of the first IGBT is connected to a collector of the second IGBT, the gate of the second IGBT is connected to the gate drive resistor, an emitter of the second IGBT is grounded, an inductor being connected in parallel is at between the emitter and the collector of the first IGBT.

3. The universal online detection device configured for detecting the IGBT collector current according to claim 2, wherein the Miller plateau detection module comprises: a bandpass filter, an amplifier, and a high-speed comparator;

wherein the bandpass filter includes: a high-pass filter and a low-pass filter, the high-pass filter is connected to the gate of the second IGBT drive module, extracting slope characteristics of the gate drive voltage of the second IGBT, the low-pass filter is used to filter out high-frequency noise contained in an output of the high-pass filter;

wherein the amplifier includes: an operational amplifier circuit, an input of the amplifier is connected to an output of the bandpass filter, amplifying the output of the bandpass filter;

wherein a high-speed comparator's input is connected to an output of the amplifier and a 1.8V reference voltage, an output of the high-speed comparator is connected to the DSP module, converting the output of the amplifier and the reference voltage into pulses containing only high and low levels.

4. The universal online detection device configured for detecting the IGBT collector current according to claim 1, wherein the gate current integration module includes: a buffer, an analog switch, and an RC fully differential integrator;

wherein the buffer is connected to the two ends of the gate drive resistor and is used to isolate the voltage across the gate drive resistor from the analog switch and the RC fully differential integrator;

wherein one end of the analog switch is connected to an output of the buffer, and the other end is connected to an input of the RC fully differential integrator, realizing connecting the voltage across the gate drive resistor to the RC fully differential integrator during the Miller plateau period through the Miller plateau signal output by the DSP module;

wherein the RC fully differential integrator is connected to an output of the analog switch, during the Miller plateau period, when the analog switch is open, the voltage across the gate drive resistor is fed into the RC fully differential integrator, the integrator integrates a differential signal ($V_{IN\_DIFF}$) and outputs a differential integration signal ($V_{OUT\_DIFF}$).

5. A detection method for the universal online detection device configured for detecting the IGBT collector current according to claim 1, wherein when a Miller plateau region is detected in the gate voltage of the IGBT drive module, the voltage across the gate drive resistor is integrated during the Miller plateau period, and the integral output of the gate current during the Miller plateau is obtained;

measurements are conducted for three sets of different collector currents, obtaining output values of the integrator and the corresponding collector current values;

within the DSP module, a second-order polynomial function relating the collector current to the integrator output values is formed based on these measurements; and the detection of the collector current is then achieved using the second-order polynomial function and integrator output values.

6. The detection method for the universal online detection device configured for detecting the IGBT collector current according to claim 5, wherein the detection method includes the following specific steps:

step 1: the Miller plateau detection module processes the gate drive waveform of the IGBT under test, extracting the Miller plateau region from the gate drive waveform of the IGBT under test;

step 2: the gate drive current integration module of the IGBT under test extracts the voltage across the gate drive resistor, integrates the voltage waveform during the Miller plateau period, and the integration result characterizes the gate current during the Miller plateau;

step 3: three sets of different load currents are measured for the integrator output voltage and collector current, an internal DSP module performs a second-order polynomial fitting, obtaining a function describing the relationship between collector current and integrator output voltage, the fitted result is then utilized to achieve online measurement of the collector current through the gate current.

7. The detection method for the universal online detection device configured for detecting the IGBT collector current according to claim 6, wherein the collector current and the gate current of the IGBT under test, the second IGBT, meet the following equations during the Miller plateau period of the IGBT under test (second IGBT) meet the following equations:

during the transient when the second IGBT is turned on:

$$I_C = -\frac{R_{G(ON)}G_m}{2}I_G + \frac{G_m(V_{DRIVE} - V_{TH})}{2}, \tag{25}$$

during the transient when the second IGBT is turned off:

$$I_C = -\frac{R_{G(OFF)}G_m}{2}I_G + \frac{G_m V_{TH}}{2}, \tag{26}$$

wherein $I_C$ represents the collector current of the IGBT under test (the second IGBT), $R_{G(ON)}$ and $R_{G(OFF)}$ are gate resistances during on-state and off-state, $G_m$ denotes transconductance of the IGBT under test (the second IGBT), $I_G$ is the gate current during the Miller plateau period of the IGBT under test (the second IGBT), $V_{DRIVE}$ denotes a drive voltage of the IGBT under test (the second IGBT), and $V_{TH}$ is a threshold voltage of the IGBT under test (the second IGBT).

8. The detection method for the universal online detection device configured for detecting the IGBT collector current according to claim 6, wherein integrating the voltage across the gate drive resistor during the Miller plateau period, and obtaining the integral output of the gate current during the Miller plateau includes:

during the Miller plateau period, with the analog switch open, feeding the voltage across the gate drive resistor is fed into the RC fully differential integrator, integrating, by the RC fully differential integrator, integrates the differential signal ($V_{IN\_DIFF}$) and outputs outputting the differential integration signal ($V_{OUT\_DIFF}$), wherein the relationship between the input and output of the RC fully differential integrator is expressed as:

$$V_{OUT\_DIFF} = \frac{V_{IN\_DIFF}}{RC} t_{miller} = \frac{I_G \times R_{G(OFF)}}{RC} t_{miller}, \quad (27)$$

wherein RC represents resistance and capacitance values in the RC fully differential integrator, $t_{miller}$ is a fixed Miller plateau duration controlled by the DSP module, $I_G$ is the gate current of the IGBT under test, and $R_{G(OFF)}$ is the gate turn-off resistance.

9. The detection method for the universal online detection device configured for detecting the IGBT collector current according to claim 6, wherein the second-order polynomial function expression for the relationship between the collector current and the integrator output values is as follows:

$$I_C = aV_{OUT\_DIFF}^2 + bV_{OUT\_DIFF} + c, \quad (28)$$

wherein measurements for three sets of different collector currents and integrator output values are denoted as $I_{C1}$, $V_{OUT\_DIFF1}$, $I_{C2}$, $V_{OUT\_DIFF2}$, $I_{C3}$, and $V_{OUT\_DIFF3}$, these measured values are input into the DSP module, the system of three simultaneous equations is solved using the back-substitution process and the method of eliminating principal elements:

$$\begin{cases} I_{C1} = aV_{OUT\_DIFF1}^2 + bV_{OUT\_DIFF1} + c \\ I_{C2} = aV_{OUT\_DIFF2}^2 + bV_{OUT\_DIFF2} + c, \\ I_{C3} = aV_{OUT\_DIFF3}^2 + bV_{OUT\_DIFF3} + c \end{cases} \quad (29)$$

wherein by solving for the coefficients a, b, and c, a second-order polynomial function describing the relationship between the collector current and the integrator output values is established.

* * * * *